United States Patent
Pasam et al.

(10) Patent No.: US 8,621,196 B2
(45) Date of Patent: Dec. 31, 2013

(54) BOOTING FROM AN ENCRYPTED ISO IMAGE

(75) Inventors: Seshubabu Pasam, Westford, MA (US); Michael J. Matczynski, Waltham, MA (US); Zhiyuan Zhang, Woburn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 139 days.

(21) Appl. No.: 13/283,929

(22) Filed: Oct. 28, 2011

(65) Prior Publication Data
US 2013/0111196 A1    May 2, 2013

(51) Int. Cl.
*H04L 29/06* (2006.01)

(52) U.S. Cl.
USPC ............................. 713/2; 713/189; 713/193

(58) Field of Classification Search
USPC ............................................ 713/189, 2, 193
See application file for complete search history.

(56) References Cited

U.S. PATENT DOCUMENTS

| | | | |
|---|---|---|---|
| 2010/0098255 A1* | 4/2010 | Ciet et al. | 380/277 |
| 2011/0071841 A1* | 3/2011 | Fomenko et al. | 705/1.1 |
| 2011/0185193 A1* | 7/2011 | Grube et al. | 713/194 |
| 2012/0084768 A1* | 4/2012 | Ashok et al. | 717/174 |

OTHER PUBLICATIONS

Shen, Zhidong, and Qiang Tong. "The security of cloud computing system enabled by trusted computing technology." Signal Processing Systems (ICSPS), 2010 2nd International Conference on. vol. 2. IEEE, 2010.*

* cited by examiner

*Primary Examiner* — Kambiz Zand
*Assistant Examiner* — Michael Guirguis

(57) ABSTRACT

A device is provided in a data center that is connected to a cloud computing environment. The device receives unencrypted information, and divides the unencrypted information into multiple data chunks. The device also derives an encryption key for each data chunk, of the multiple data chunks, based on a master key, a chunk number associated with each data chunk, and a salt value. The device further encrypts each data chunk with a corresponding derived encryption key, combines the encrypted data chunks to create encrypted information, and provides the encrypted information to the cloud computing environment.

15 Claims, 9 Drawing Sheets

BOOTING FROM AN ENCRYPTED ISO IMAGE

BACKGROUND

Cloud computing is the delivery of computing as a service rather than as a product, whereby shared resources, software, and information are provided to client devices (e.g., computers, smart phones, etc.) as a utility over a secure or an unsecure network, such as the Internet. Cloud computing environments provide computation, software, data access, and/or storage services that do not require end-user knowledge of a physical location and configuration of a system that delivers the services.

A data center is a facility used to house computer systems and associated components, such as telecommunications and storage systems. A data center generally includes redundant or backup power supplies, redundant data communications connections, environmental controls (e.g., air conditioning, fire suppression, etc.), and security devices. In one example, a data center may share information with a cloud computing environment that may be utilized by client devices via the cloud computing environment.

An International Organization for Standards (ISO) image is an archive file of a disc, such as an optical disk. An ISO image is composed of data content of every written sector of the disc, including a disc file system. ISO images can be created from optical discs or can be used to recreate optical discs using software. ISO images may contain drivers, program installation packages, or various file formats needed to "boot" or "mount" in order to run a client device. In one example, ISO images to be booted by multiple public client devices may be created by a data center and stored in a cloud computing environment. However, such ISO images may not be securely provided to the multiple client devices or the cloud computing environment, and may be subject to hacking and/or other types of security breaches. The ISO images may also be subject to security breaches (e.g., customer information leakage) while resident in the cloud computing environment.

DETAILED DESCRIPTION OF PREFERRED EMBODIMENTS

The following detailed description refers to the accompanying drawings. The same reference numbers in different drawings may identify the same or similar elements.

Systems and/or methods described herein may enable booting from local or a remote encrypted information (e.g., an encrypted ISO image), and may enable random blocks of data (i.e., data chunks) of the encrypted information to be decrypted without reading the entire information. The systems and/or methods may utilize any symmetric-key method to encrypt the information, such as an Advanced Encryption Standard (AES) with a key size of two-hundred and fifty-six (256) bits and a pseudo randomly generated master key. The systems and/or methods may make the encrypted information publically available, and may provide the master key and a location of the encrypted information to a decryption process. The decryption process may decrypt a portion of the encrypted information using the master key, and may make the decrypted information portion available to, for example, a virtual machine (VM) provided in a cloud computing environment.

As used herein, the term "user" is intended to be broadly interpreted to include a client device, or a user of a client device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
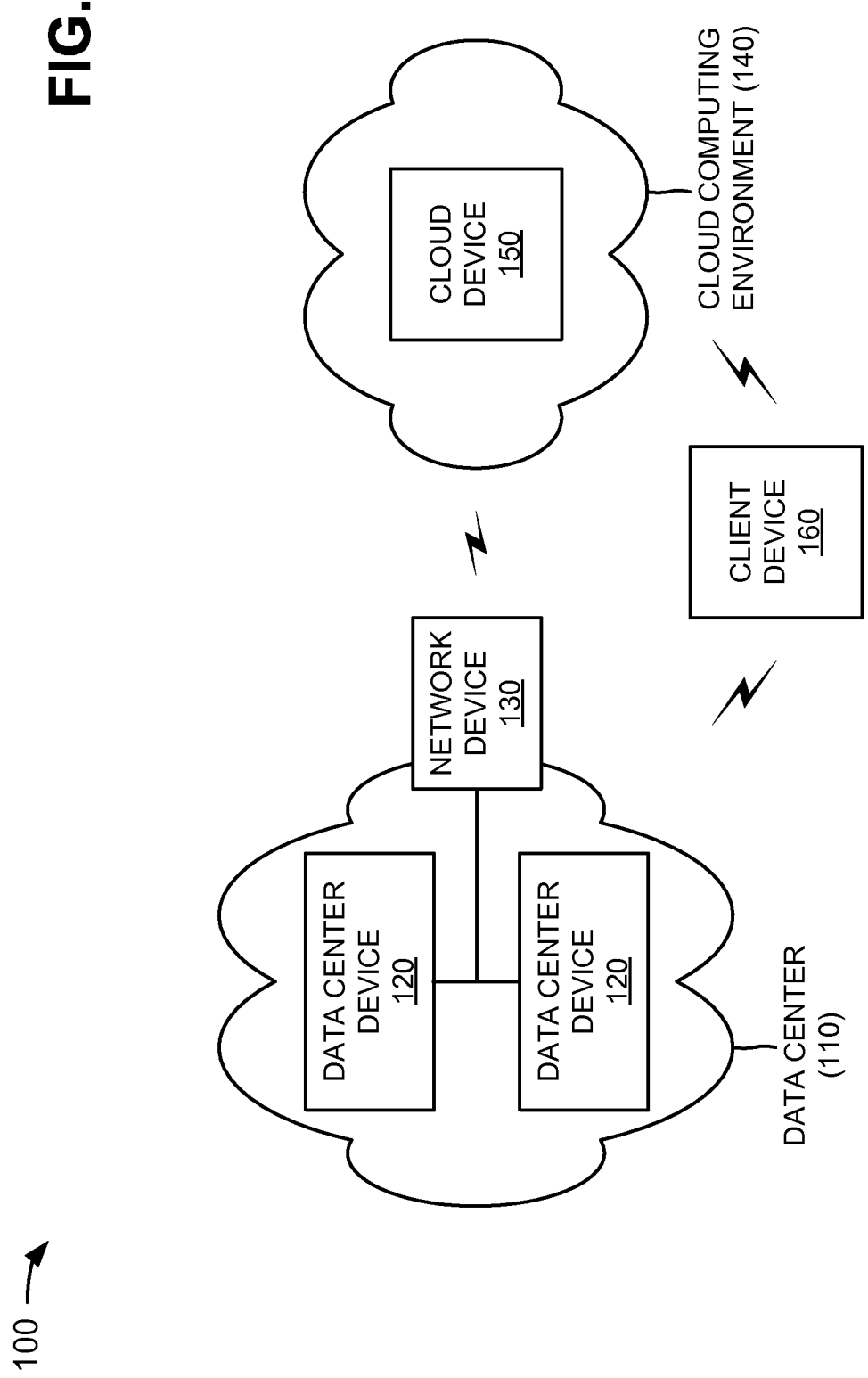
FIG. 1 is a diagram of an example network in which systems and/or methods described herein may be implemented.

FIG. 1 is a diagram of an example network 100 in which systems and/or methods described herein may be implemented. As illustrated, network 100 may include a data center 110 that includes data center devices 120 and a network device 130; a cloud computing environment 140 that includes a cloud device 150; and a client device 160. Devices and/or networks of network 100 may interconnect via wired and/or wireless connections. One data center 110, two data center devices 120, one network device 130, one cloud computing environment 140, one cloud device 150, and one client device 160 have been illustrated in FIG. 1 for simplicity. In practice, there may be more data centers 110, data center devices 120, network devices 130, cloud computing environments 140, cloud devices 150, and/or client devices 160.

Data center 110 may include a facility or a network with computer systems, server devices, and associated components, such as telecommunications and storage systems. Data center 110 may include redundant or backup power supplies, redundant data communications connections, environmental controls, security devices, etc. In one example, data center 110 may share information, with cloud computing environment 140, which may be utilized by client device 160. Data center 110 may include resources, such as a device (e.g., a network device, a server, a computer system, etc.), data (e.g., availability information, license information, etc.), a service (e.g., a load balancing service, network information collection, etc.), etc.

Data center device 120 may include one or more server devices, or other types of computation and/or communication devices, that gather, process, search, and/or provide information in a manner described herein. In one example implementation, data center device 120 may receive unencrypted information (e.g., an unencrypted ISO image), and may encrypt the information. Data center device 120 may provide the encrypted information to cloud computing environment 140 (e.g., to cloud device 150) via network device 130.

Network device 130 may include a gateway, a router, a switch, a firewall, a network interface card (NIC), a hub, a bridge, a proxy server, a multiplexer, or some other type of device that processes and/or transfers traffic. In one example implementation, network device 130 may include a firewall that creates an encrypted tunnel with cloud device 150 so that a secure data path may be provided between data center devices 120 and cloud device 150.

Cloud computing environment 140 may include an environment that delivers computing as a service rather than as a product, whereby shared resources, software, and information may be provided to client device 160 as a utility over a network. Cloud computing environment 140 may provide computation, software, data access, and/or storage services that do not require end-user (e.g., client device 160) knowledge of a physical location and configuration of a system that delivers the services. In one implementation, cloud computing environment 140 may include a data center similar to data center 110.

Cloud device 150 may include one or more server devices, or other types of computation and/or communication devices, that gather, process, search, and/or provide information in a manner described herein. In one example implementation, cloud device 150 may receive encrypted information (e.g., an encrypted ISO image) from data center device 120, and may store the encrypted information. Cloud device 150 may receive (e.g., from client device 160) a request for a portion of the encrypted information. Based on the request, cloud device 150 may retrieve the portion of the encrypted information, may decrypt the portion of the encrypted information, and may securely provide the decrypted information portion to client device 160.

Client device 160 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; or other types of computation and/or communication devices. In one example, client device 160 may include a device that is capable of communicating with cloud device 150 in order to securely receive encrypted information (e.g., an encrypted ISO image).

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
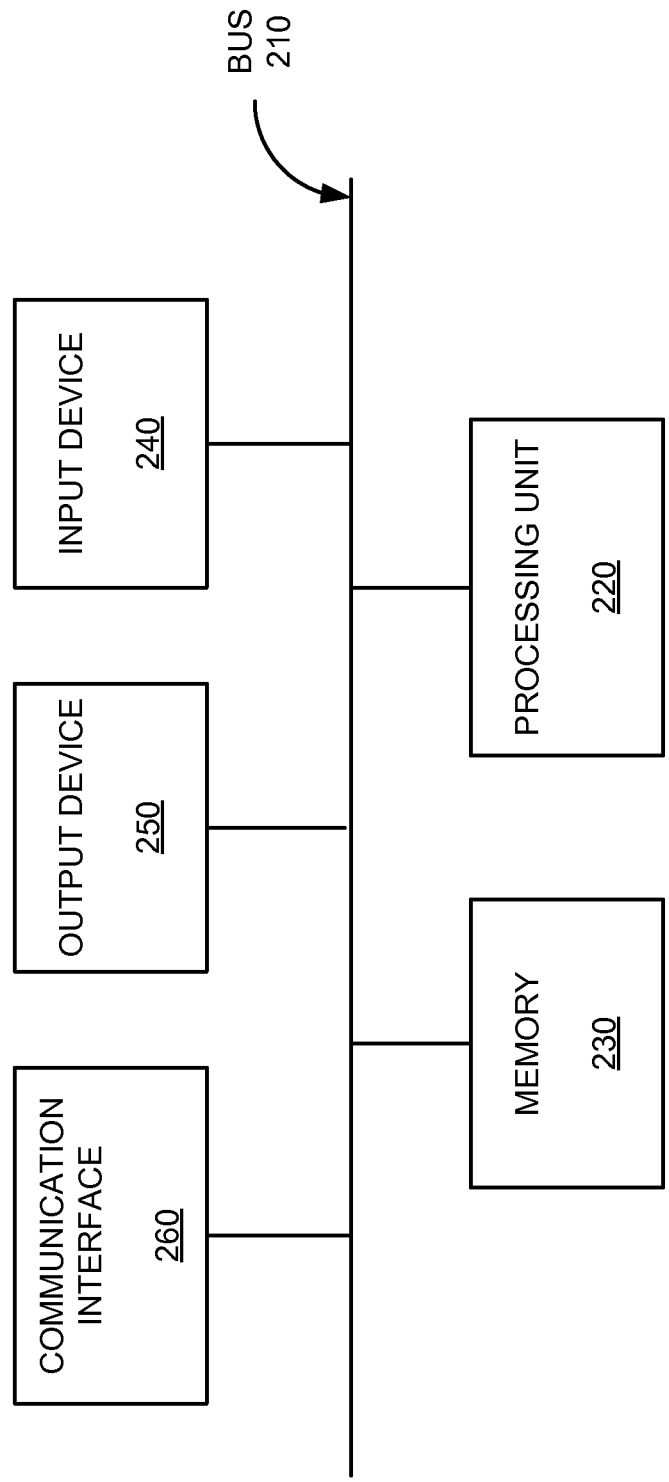
FIG. 2 is a diagram of example components of a device that may correspond to one of the devices of the network depicted in FIG. 1.

FIG. 2 is a diagram of example components of a device 200 that may correspond to one or more devices of network 100 (FIG. 1). In one example implementation, one or more of the devices of network 100 may include one or more devices 200 or one or more components of device 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
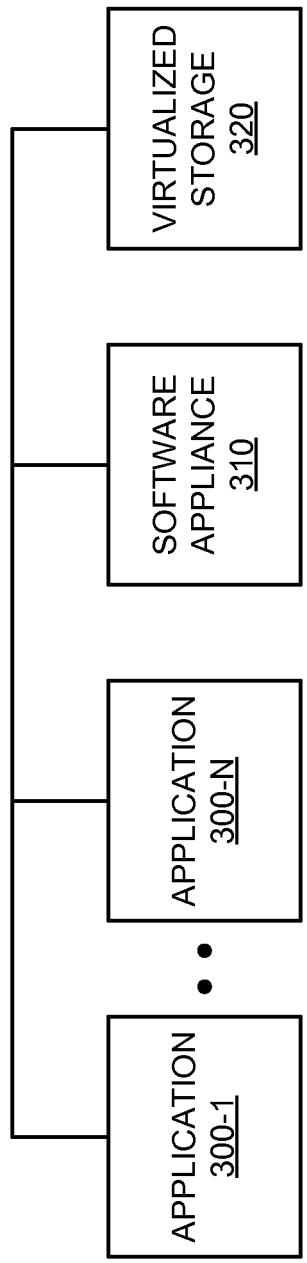
FIG. 3 is a diagram of example functional components of a data center device of FIG. 1.

FIG. 3 is a diagram of example functional components of data center device 120. In one implementation, the functions described in connection with FIG. 3 may be performed by one or more components of device 200 (FIG. 2) or by one or more devices 200. As shown in FIG. 3, data center device 120 may include multiple applications 300-1 through 300-N (collectively referred to herein as "applications 300," and, in some instances, singularly as "application 300"), a software appliance 310, and virtualized storage 320.

Applications 300 may include one or more software applications, available at data center device 120, that are dependent upon the function of data center device 120. For example, applications 300 may include software that handles core business and operational data of an organization, enterprise software, telecommunications software, etc. Applications 300 may be designed for execution by multiple host devices, where each host device may execute a single component. In one example, components of applications 300 may include databases, file servers, application servers, middleware, etc.

Software appliance 310 may securely bridge data center device 120 with cloud computing services provided by cloud computing environment 140. Software appliance 310 may extend data center 110 security and control into cloud computing environment 140 so that applications 300 may remain integrated with data center 110 tools and policies and may be managed as if applications 300 were executing locally. Software appliance 310 may move applications 300 between data center 110 and cloud computing environment 140 based on requirements of an organization. In one example, software appliance 310 may include management components for discovering applications 300, orchestrating cloud deployments, and managing cloud utilization. Software appliance 310 may create a secure data path to bridge network connectivity between data center 110 and a chosen cloud computing provider. In one example implementation, data center device 120 may utilize multiple software appliances 310 for availability and scaling purposes.

Virtualized storage 320 may include storage systems or devices that may use virtualization techniques to enable better functionality and more advanced features within the storage systems or devices of data center device 120. In one example, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and performance of non-disruptive file migrations.

Although FIG. 3 shows example functional components of data center device 120, in other implementations, data center device 120 may include fewer functional components, different functional components, differently arranged functional components, or additional functional components than depicted in FIG. 3. Additionally, or alternatively, one or more functional components of data center device 120 may perform one or more other tasks described as being performed by one or more other functional components of data center device 120.

Figure 4:
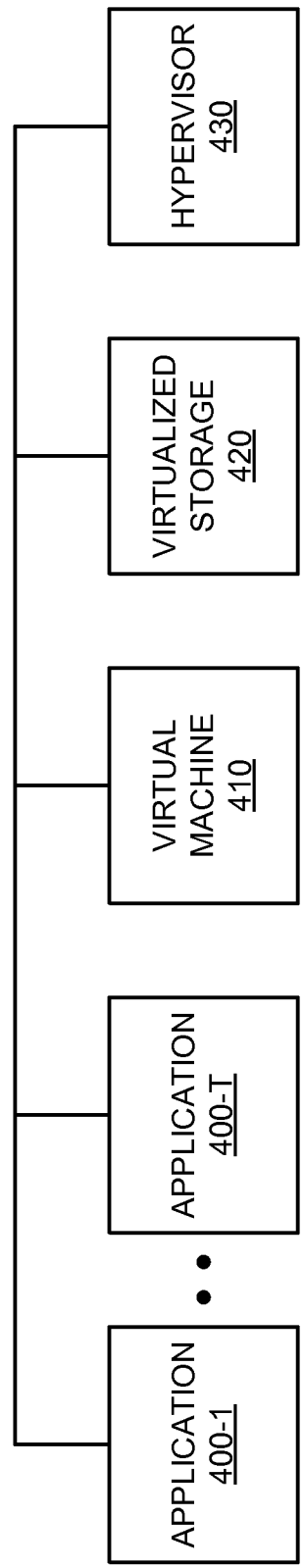
FIG. 4 is a diagram of example functional components of a cloud device of FIG. 1.

FIG. 4 is a diagram of example functional components of cloud device 150. In one implementation, the functions described in connection with FIG. 4 may be performed by one or more components of device 200 (FIG. 2) or by one or more devices 200. As shown in FIG. 4, cloud device 150 may include multiple applications 400-1 through 400-T (collectively referred to herein as "applications 400," and, in some instances, singularly as "application 400"), a virtual machine 410, virtualized storage 420, and a hypervisor 430.

Applications 400 may include one or more software applications that may be provided to or accessed by client device 160, which may eliminate a need to install and execute the software applications on client device 160. For example, applications 400 may include word processing software, database software, content, monitoring software, financial software, communication software, and/or any other software capable of being provided via a cloud computing environment.

Virtual machine (VM) 410 may include a software implementation of a machine (e.g., a computer) that executes programs like a physical machine. Virtual machine 410 may be either a system virtual machine or a process virtual machine, depending upon use and degree of correspondence to any real machine by virtual machine 410. A system virtual machine may provide a complete system platform that supports execution of a complete operating system (OS). A process virtual machine may execute a single program, and may support a single process. In one example implementation, virtual machine 410 may execute on behalf of a data center 110 user (e.g., client device 160), and may manage infrastructure of cloud computing environment 140, such as data management, synchronization, and long-duration data transfers. Virtual machine 410 may provide encryption services for network and storage utilization to ensure that cloud computing environment providers do not have access to data center 110 network or storage communications.

Virtualized storage 420 may include storage systems or devices that may use virtualization techniques to enable better functionality and more advanced features within the storage systems or devices of cloud device 150. In one example, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and performance of non-disruptive file migrations.

Hypervisor 430 may provide hardware virtualization techniques that allow multiple operating systems (e.g., "guest operating systems") to execute concurrently on a host computer. Hypervisor 430 may present to the guest operating systems a virtual operating platform, and may manage the execution of the guest operating systems. Multiple instances of a variety of operating systems may share the virtualized hardware resources. Hypervisor 430 may provide an interface to infrastructure as a service (IaaS) provided by cloud computing environment 140.

Although FIG. 4 shows example functional components of cloud device 150, in other implementations, cloud device 150 may include fewer functional components, different functional components, differently arranged functional components, or additional functional components than depicted in FIG. 4. Additionally, or alternatively, one or more functional components of cloud device 150 may perform one or more other tasks described as being performed by one or more other functional components of cloud device 150.

Figure 5:
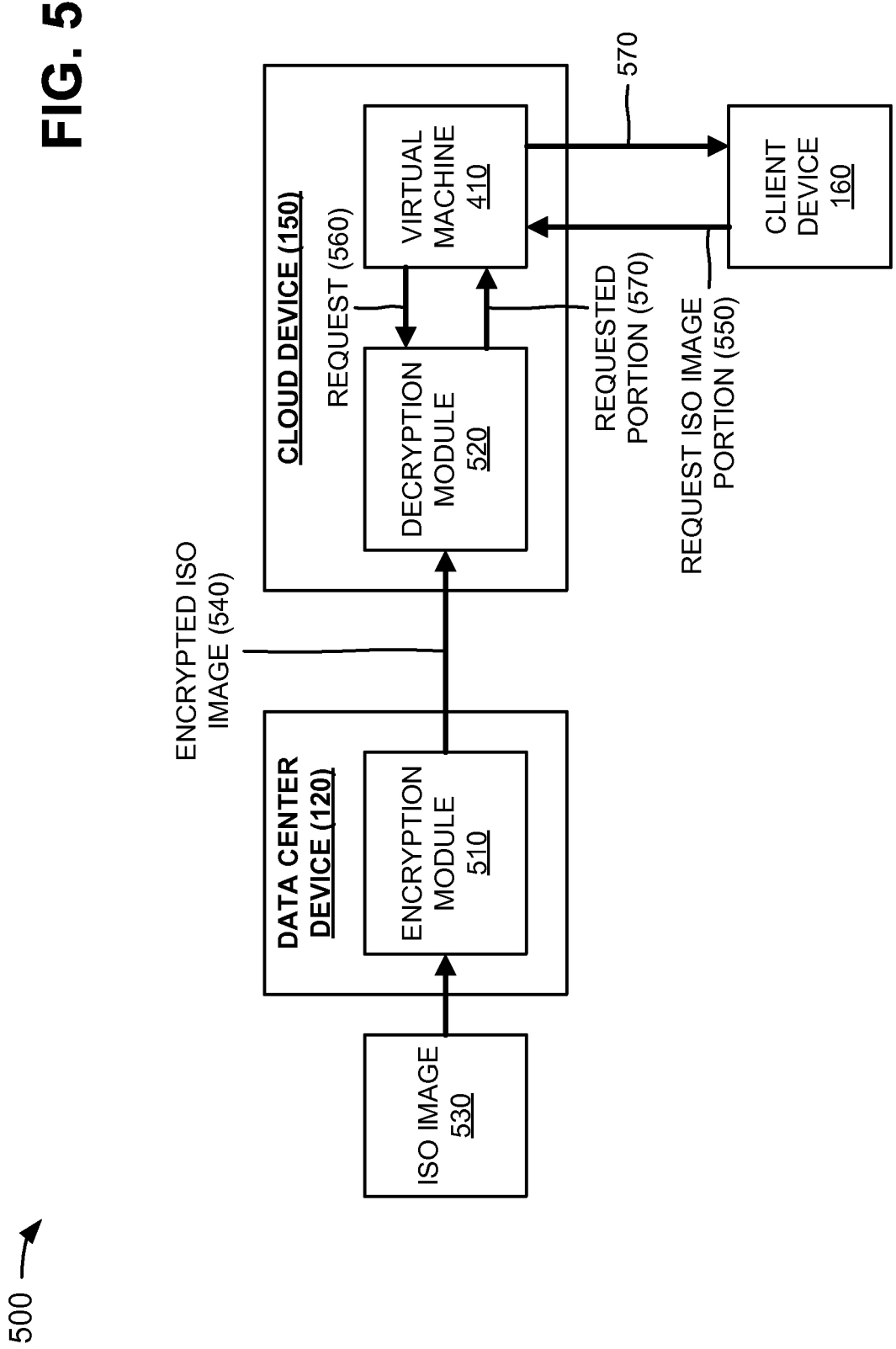
FIG. 5 is a diagram of example operations capable of being performed by an example portion of the network in FIG. 1.

FIG. 5 is a diagram of example operations capable of being performed by an example portion 500 of network 100 (FIG. 1). As shown, network portion 500 may include data center device 120, cloud device 150 with virtual machine 410, and client device 160. Data center device 120, cloud device 150, client device 160, and virtual machine 410 may include the features described above in connection with, for example, one or more of FIGS. 1-4.

As further shown in FIG. 5, data center device 120 may include an encryption module 510 and cloud device 150 may include a decryption module 520. Encryption module 510 may receive unencrypted information, such as, for example, an unencrypted ISO image 530. In one example, ISO image 530 may be replaced with virtual floppy disk images, IMG file format content, etc. Encryption module 510 may encrypt ISO image 530 to create an encrypted ISO image 540, and may provide encrypted ISO image 540, or a location (e.g., an IP address, a file transfer protocol (FTP) site address, etc.) of encrypted ISO image 540, to decryption module 520 of cloud device 150.

Decryption module 520 may receive encrypted ISO image 540, or the location of encrypted ISO image 540, from encryption module 510 of data center device 120, and may store encrypted ISO image 540 (e.g., in virtualized storage 420, not shown). As further shown in FIG. 5, virtual machine 410 of cloud device 150 may receive, from client device 160, a request 550 for a portion of encrypted ISO image 540. In turn, virtual machine 410 may provide a request 560 for the portion of encrypted ISO image 540 to decryption module 520. Based on request 560, decryption module 520 may retrieve the portion of encrypted ISO image 540, and may decrypt the portion of encrypted ISO image 540 to create the requested decrypted portion of ISO image 540, as indicated by reference number 570. Decryption module 520 may provide requested portion 570 (i.e., decrypted portion of ISO image 540) to virtual machine 410, and virtual machine 410 may securely provide requested portion 570 to client device 160.

Further details of encryption module 510 and decryption module 520 are provided below in connection with FIGS. 6 and 7, respectively.

Although FIG. 5 shows example components of network portion 500, in other implementations, network portion 500 may include fewer components, different components, differently arranged components, or additional components than depicted in FIG. 5. Additionally, or alternatively, one or more components of network portion 500 may perform one or more other tasks described as being performed by one or more other components of network portion 500.

Figure 6:
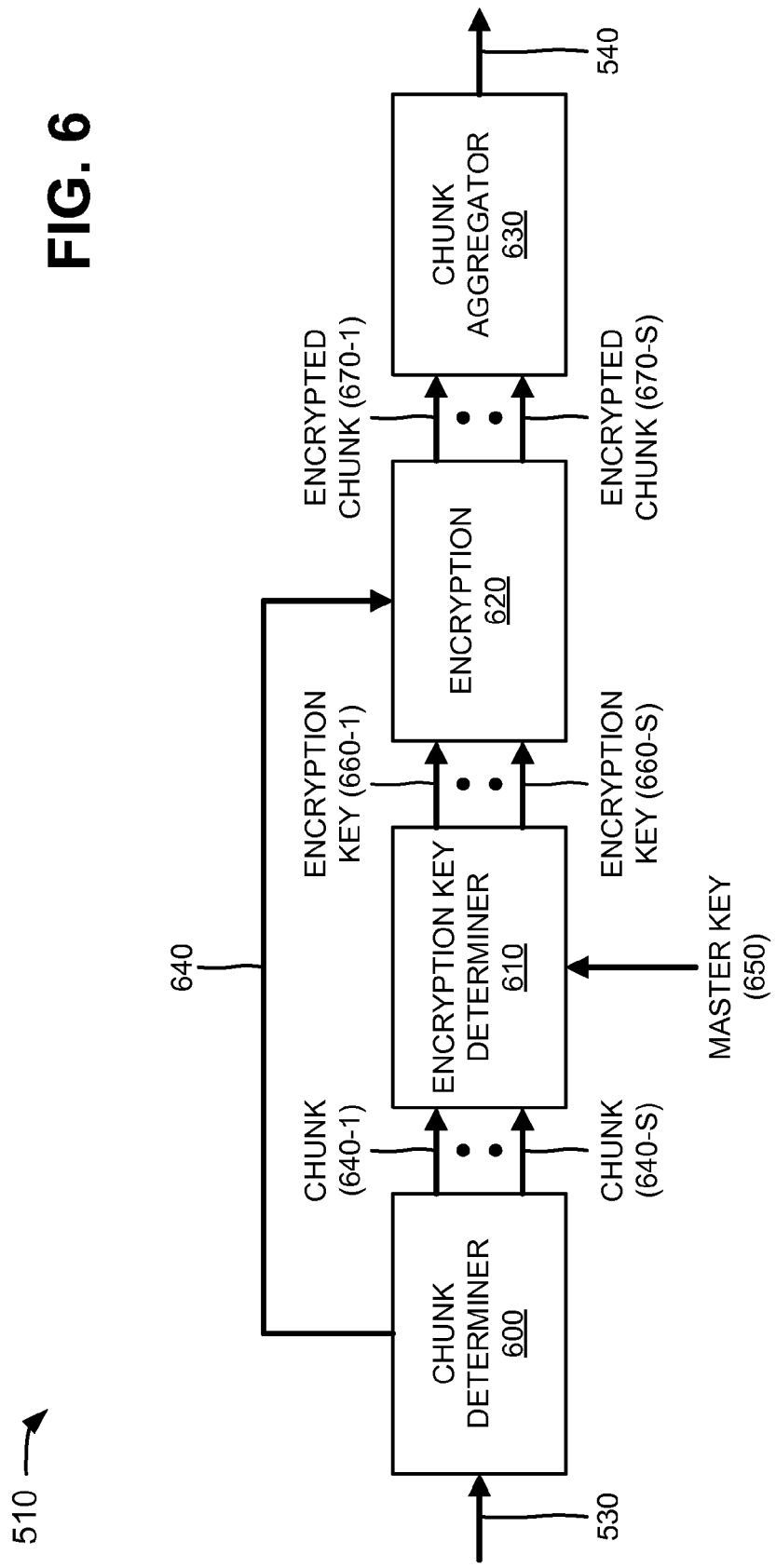
FIG. 6 is a diagram of example functional components of an encryption module of a data center device.

FIG. 6 is a diagram of example functional components of encryption module 510. In one implementation, the functions described in connection with FIG. 6 may be performed by one or more components of device 200 (FIG. 2) or by one or more devices 200. As shown in FIG. 6, encryption module 510 may include a chunk determiner component 600, an encryption key determiner component 610, an encryption component 620, and a chunk aggregator component 630.

Chunk determiner component 600 may receive unencrypted ISO image 530, and may divide unencrypted ISO image 530 into multiple data chunks 640-1 through 640-S (collectively referred to herein as "data chunks 640," and, in some instances, singularly as "data chunk 640"). Each data chunk 640 may be a multiple of a particular size (e.g., one (1) kilobyte) that depends on how small unencrypted ISO image 530 is to be divided. In one example, each data chunk 640 may include a chunk size of eight kilobytes (or 8,192 bytes) and may be numbered as follows:

1 byte to 8192 byte—1st chunk
8193 byte to 16384 byte—2nd chunk
16385 byte to 24576 byte—3rd chunk As further shown in FIG. 6, chunk determiner component 600 may provide the numbered data chunks 640 to encryption key determiner component 610.

Encryption key determiner component 610 may receive data chunks 640 from chunk determiner component 600, and may receive a pseudo randomly generated master key 650. Encryption key determiner component 610 may utilize master key 650 and a chunk number of each data chunk 640 to determine an encryption key for each data chunk 640. In one example, encryption key determiner component 610 may determine an encryption key (e.g., encryption keys 660-1 through 660-S, collectively referred to herein as "encryption keys 660") for each data chunk 640 according to the following equation:

Encryption key for chunk $N$=Hash function(master key,chunk number $N$,salt).

The hash function may be any secure cryptographic hash function, such as, for example, a SHA-256 hash algorithm.

Encryption key determiner component 610 may append master key 650, the chunk number, and a randomly generated fixed length salt value (i.e., random bits), and may apply the hash function. In one example, the salt may be optional in the hash function. The salt and master key 650 may be the same for all data chunks 640, while the chunk number may vary for each data chunk 640. The order in which master key 650, the chunk number, and the salt are appended may vary, but the same order may be used for the derived encryption keys 660. As further shown in FIG. 6, encryption key determiner component 610 may provide encryption keys 660 to encryption component 620.

Encryption component 620 may receive data chunks 640 from chunk determiner component 600, and may receive encryption keys 660 from encryption key determiner component 610. Encryption component 620 may encrypt each data chunk 640 with a corresponding encryption key 660. For example, encryption component 620 may encrypt data chunk 640-1 with encryption key 660-1, may encrypt data chunk 640-2 with encryption key 660-2, etc. to produce encrypted data chunks 670-1 through 670-S (collectively referred to herein as "encrypted data chunks 670," and, in some instances, singularly as "encrypted data chunk 670"). In one example, if a last data chunk 640 is smaller than a defined chunk size (e.g., 8192 bytes), encryption component 620 may pad the last data chunk 640 using a padding method. As further shown in FIG. 6, encryption component 620 may provide encrypted data chunks 670 to chunk aggregator component 630.

Chunk aggregator component 630 may receive encrypted data chunks 670 from encryption component 620, and may aggregate or reassemble encrypted data chunks 670 to generate encrypted ISO image 540. Chunk aggregator component 630 may provide encrypted ISO image 540 to decryption module 520 of cloud device 150 (e.g., via an upload to a web server, a FTP server, etc.).

Although FIG. 6 shows example functional components of encryption module 510, in other implementations, encryption module 510 may include fewer functional components, different functional components, differently arranged functional components, or additional functional components than depicted in FIG. 6. Additionally, or alternatively, one or more functional components of encryption module 510 may perform one or more other tasks described as being performed by one or more other functional components of encryption module 510.

Figure 7:
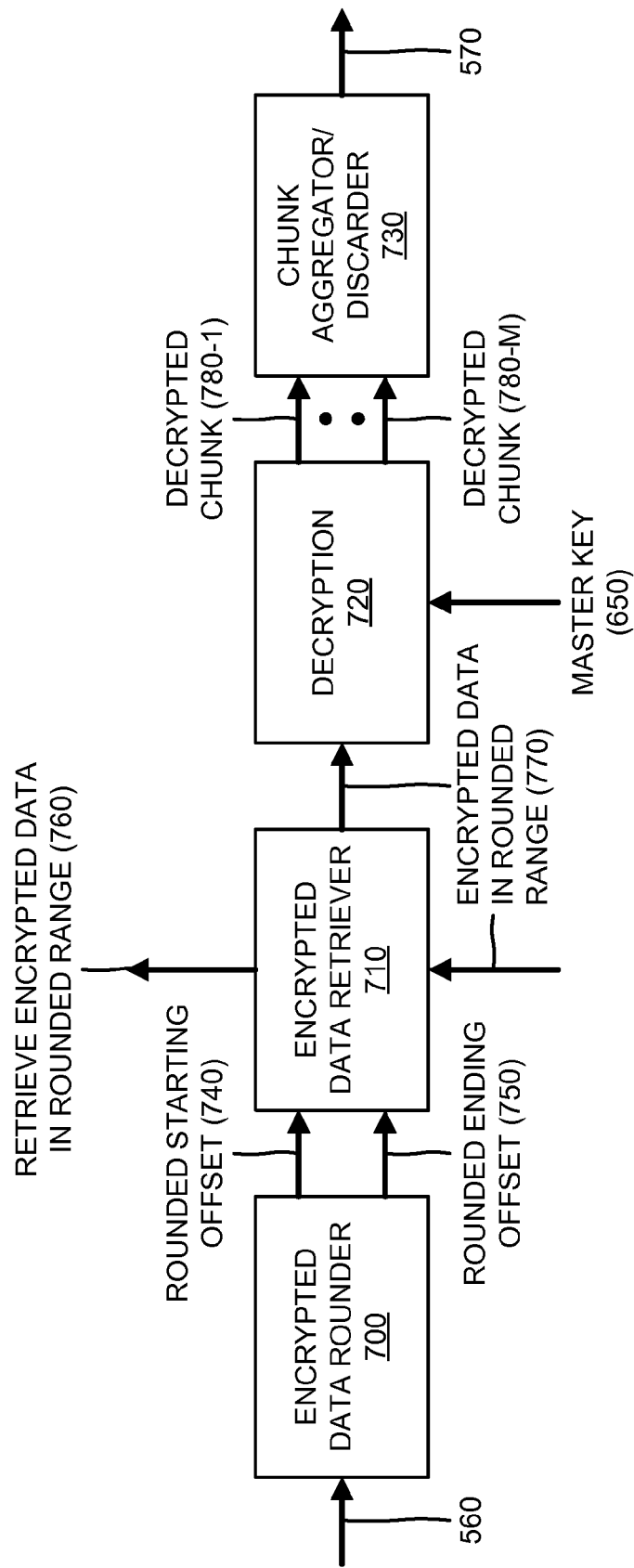
FIG. 7 is a diagram of example functional components of a decryption module of the cloud device.

FIG. 7 is a diagram of example functional components of decryption module 520. In one implementation, the functions described in connection with FIG. 7 may be performed by one or more components of device 200 (FIG. 2) or by one or more devices 200. As shown in FIG. 7, decryption module 520 may include encrypted data rounder component 700, encrypted data retriever component 710, a decryption component 720, and a chunk aggregator/discarder component 730.

In one example implementation, a location of encrypted ISO image 540, master key 650, and the salt (if any) may be provided to decryption module 520. Decryption module 520 may make encrypted ISO image 540 available to virtual machine 410 (FIG. 4). When virtual machine 410 boots from encrypted ISO image 540, virtual machine 410 may provide request 560 for the portion of encrypted ISO image 540 to decryption module 520.

Encrypted data rounder component 700 may receive request 560. In one example, request 560 may request a range of data of encrypted ISO image 540. The range may include a range of values from a starting byte offset (e.g., 192512 byte) to an ending byte offset (e.g., 299008 byte). Encrypted data rounder component 700 may round the starting byte offset down to a next lower data chunk size starting value (e.g., a floor) according to the following equation:

floor(starting byte offset/chunk size)*chunk size).

For example, encrypted data rounder component 700 may round the 192512 starting byte offset down to a next lower chunk size starting value of 188416 (i.e., a rounded starting offset 740). Encrypted data rounder component 700 may round the ending byte offset up to a next upper data chunk size starting value (e.g., a ceiling) according to the following equation:

ceiling(ending byte offset/chunk size)*chunk size).

For example, encrypted data rounder component 700 may round the 299008 ending byte offset up to a next upper chunk size starting value of 303104 (i.e., a rounded ending offset 750). After rounding the starting and ending byte offsets, the data to retrieve may be a multiple of the chunk size. As further shown in FIG. 7, encrypted data rounder component 700 may provide rounded starting offset 740 and rounded ending offset 750 to encrypted data retriever component 710.

Encrypted data retriever component 710 may receive rounded starting offset 740 and rounded ending offset 750 from encrypted data rounder component 700. Encrypted data retriever component 710 may retrieve encrypted ISO image 540 data in the rounded range defined by rounded starting offset 740 and rounded ending offset 750, as indicated by reference number 760. For example, encrypted data retriever component 710 may retrieve encrypted data from the 188416 byte to the 303104 byte (i.e., 14 chunks of 8192 bytes). Encrypted data retriever component 710 may receive encrypted data 770 in the rounded range, and may provide encrypted data 770 in the rounded range to decryption component 720.

Decryption component 720 may receive encrypted data 770 in the rounded range from encrypted data retriever component 710, and may receive master key 650. Decryption component 720 may derive an encryption key for each data chunk of encrypted data 770 using master key 650, the chunk number, and the optional salt. Using a corresponding derived encryption key, decryption component 720 may decrypt each data chunk of encrypted data 770 to generate decrypted data chunks 780-1 through 780-M (collectively referred to herein as "decrypted data chunks 780," and, in some instances, singularly as "decrypted data chunk 780"). As further shown in FIG. 7, decryption component 720 may provide decrypted data chunks 780 to chunk aggregator/discarder component 730.

Chunk aggregator/discarder component 730 may receive decrypted data chunks 780 from decryption component 720, and may aggregate or reassemble decrypted data chunks 780 to generate requested portion 570 of ISO image 530. Chunk aggregator/discarder component 730 may provide requested portion 570 to virtual machine 410. In one example, decrypted data chunks 780 may be larger than a range requested by virtual machine 410. In such situations, chunk aggregator/discarder component 730 may discard the excess data and the requested range of data may be provided to virtual machine 410.

In one example implementation, when virtual machine 410 requests a range of data of encrypted ISO image 540, decryption module 520 may request more data chunks in the same request, above and beyond rounding up to a next upper data chunk size starting value. In one example, decryption module 520 may asynchronously execute an additional request that starts at an end range of the original request. Furthermore, because encrypted ISO image 540 may be read-only, cloud device 150 may cache encrypted ISO image 540 in a local cache provided in cloud device 150. The local cache may be either encrypted or decrypted, and may be small in size if cloud device 150 is limited in disk and/or memory space.

Although FIG. 7 shows example functional components of decryption module 520, in other implementations, decryption module 520 may include fewer functional components, different functional components, differently arranged functional components, or additional functional components than depicted in FIG. 7. Additionally, or alternatively, one or more functional components of decryption module 520 may perform one or more other tasks described as being performed by one or more other functional components of decryption module 520.

Figure 8:
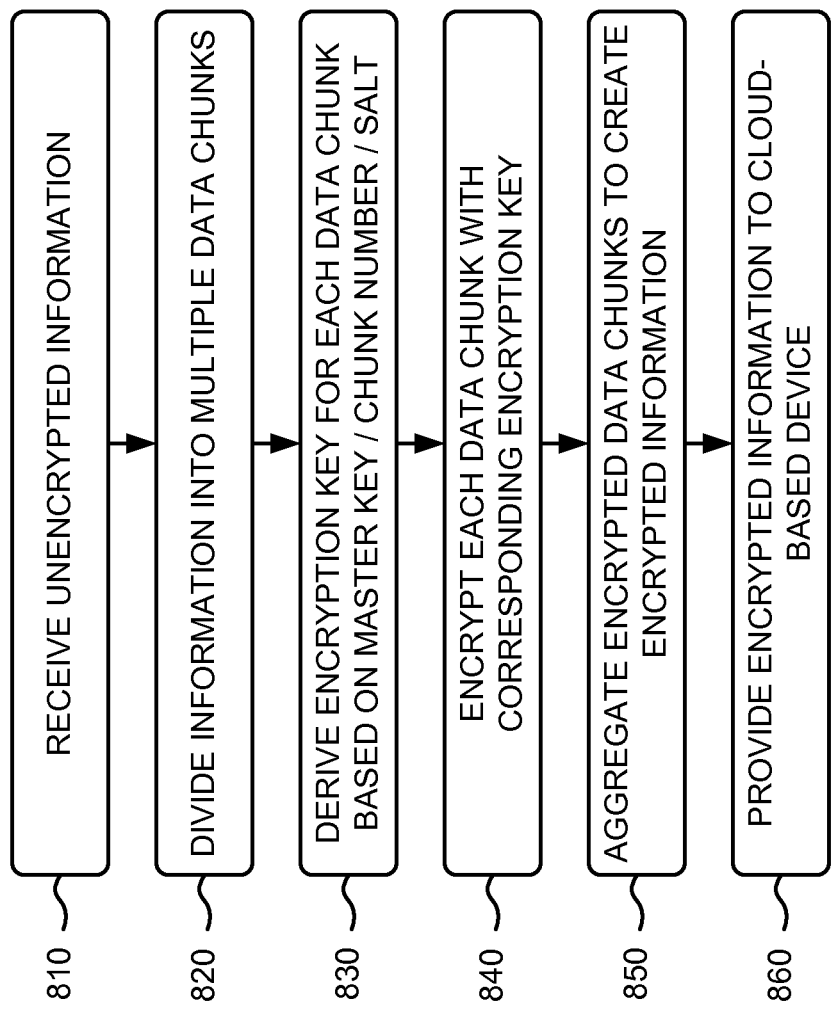
FIG. 8 is a flow chart of an example process for encrypting information according to an implementation described herein.

FIG. 8 is a flow chart of an example process 800 for encrypting information according to an implementation described herein. In one implementation, process 800 may be performed by data center device 120. Alternatively, or additionally, some or all of process 800 may be performed by another device or group of devices, including or excluding data center device 120.

As shown in FIG. 8, process 800 may include receiving unencrypted information (block 810), and dividing the unencrypted information into multiple data chunks (block 820). For example, in an implementation described above in connection with FIG. 6, chunk determiner component 600 may receive unencrypted ISO image 530, and may divide unencrypted ISO image 530 into multiple data chunks 640. Each data chunk 640 may be a multiple of a particular size (e.g., one (1) kilobyte) that depends on how small unencrypted ISO image 530 is to be divided.

As further shown in FIG. 8, process 800 may include deriving an encryption key for each data chunk based on a master key, a chunk number, and a salt (block 830), and encrypting each data chunk with a corresponding encryption key (block 840). For example, in an implementation described above in connection with FIG. 6, encryption key determiner component 610 may receive data chunks 640 from chunk determiner component 600, and may receive master key 650. Encryption key determiner component 610 may utilize master key 650, a chunk number of each data chunk 640, and an optional salt value to determine an encryption key for each data chunk 640. Encryption component 620 may receive data chunks 640 from chunk determiner component 600, and may receive encryption keys 660 from encryption key determiner component 610. Encryption component 620 may encrypt each data chunk 640 with a corresponding encryption key 660. In one example, encryption component 620 may encrypt data chunk 640-1 with encryption key 660-1, may encrypt data chunk 640-2 with encryption key 660-2, etc. to produce encrypted data chunks 670.

Returning to FIG. 8, process 800 may include aggregating the encrypted data chunks to create encrypted information (block 850), and providing the encrypted information to a cloud-based device (block 860). For example, in an implementation described above in connection with FIG. 6, chunk aggregator component 630 may receive encrypted data chunks 670 from encryption component 620, and may aggregate or reassemble encrypted data chunks 670 to generate encrypted ISO image 540. Chunk aggregator component 630 may provide (e.g., upload or copy) encrypted ISO image 540 to decryption module 520 of cloud device 150 (e.g., via an upload to a web server, a FTP server, etc.).

Figure 9:
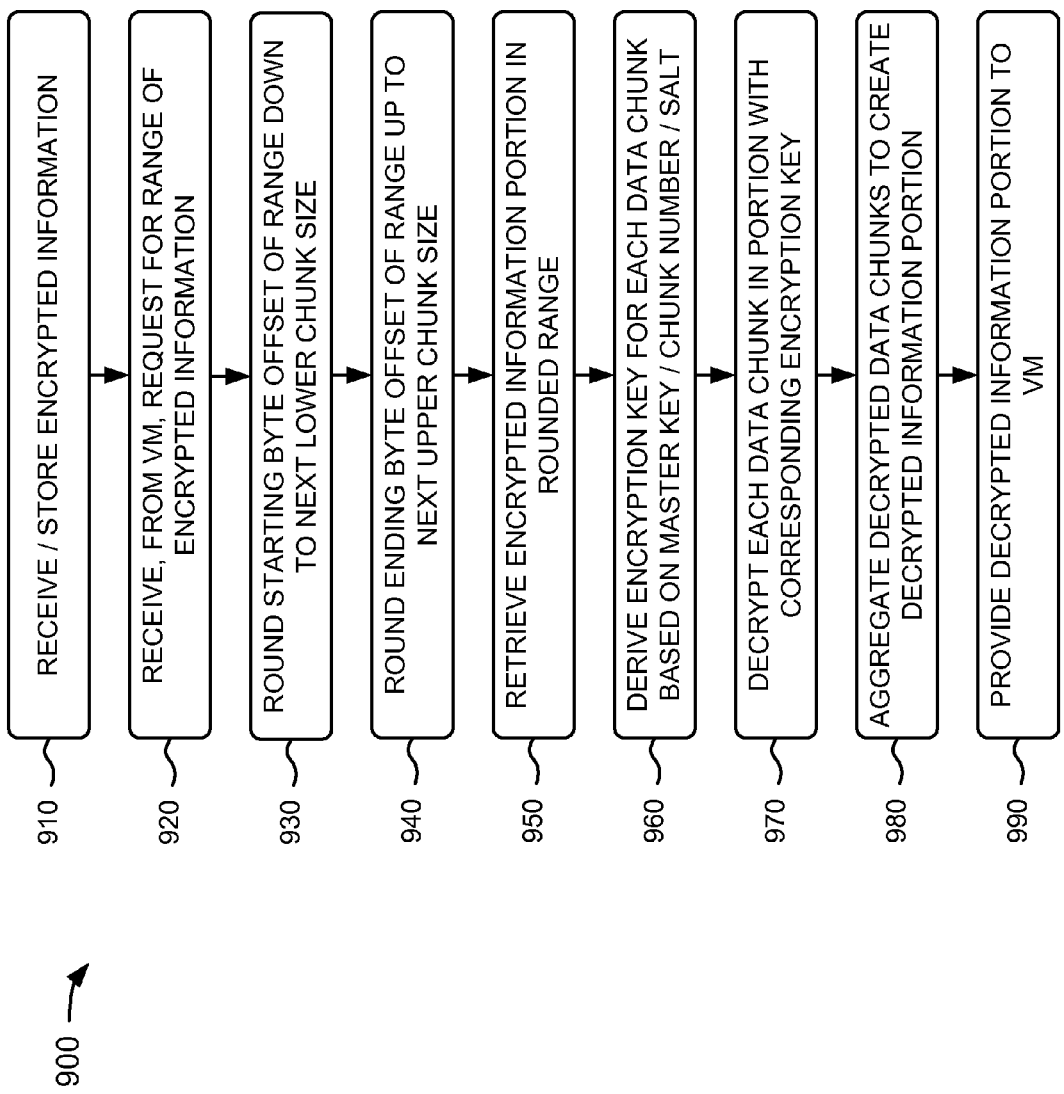
FIG. 9 is a flow chart of an example process for decrypting information according to an implementation described herein.

FIG. 9 is a flow chart of an example process 900 for decrypting information according to an implementation described herein. In one implementation, process 900 may be performed by cloud device 150. Alternatively, or additionally, some or all of process 900 may be performed by another device or group of devices, including or excluding cloud device 150.

As shown in FIG. 9, process 900 may include receiving and storing encrypted information (block 910), and receiving, from a virtual machine, a request for a range of the encrypted information (block 920). For example, in an implementation described above in connection with FIG. 7, a location of encrypted ISO image 540, master key 650, and the salt (if any) may be provided to decryption module 520. Decryption module 520 may make encrypted ISO image 540 available to virtual machine 410. When virtual machine 410 boots from encrypted ISO image 540, virtual machine 410 may provide request 560 for the portion of encrypted ISO image 540 to decryption module 520. In one example implementation, cloud device 150 may store encrypted information (e.g., encrypted ISO image 540, master key 650, and the optional salt) in a memory device, such as a RAM.

As further shown in FIG. 9, process 900 may include rounding a starting byte offset of the range down to a next lower chunk size (block 930), and rounding an ending byte offset of the range up to a next upper chunk size (block 940). For example, in an implementation described above in connection with FIG. 7, encrypted data rounder component 700 may receive request 560 for a range of data of encrypted ISO image 540. The range may include a range of values from a starting byte offset to an ending byte offset. Encrypted data rounder component 700 may round the starting byte offset down to a next lower data chunk size starting value. Encrypted data rounder component 700 may round the ending byte offset up to a next upper data chunk size starting value. After rounding the starting and ending byte offsets, the data to retrieve may be a multiple of the chunk size.

Returning to FIG. 9, process 900 may include retrieving an encrypted information portion in the rounded range (block 950), and deriving an encryption key for each data chunk in the portion based on a master key, a chunk number, and a salt (block 960). For example, in an implementation described above in connection with FIG. 7, encrypted data retriever component 710 may receive rounded starting offset 740 and rounded ending offset 750 from encrypted data rounder component 700. Encrypted data retriever component 710 may retrieve encrypted ISO image 540 data in the rounded range defined by rounded starting offset 740 and rounded ending offset 750, as indicated by reference number 760. Encrypted data retriever component 710 may receive encrypted data 770 in the rounded range. Decryption component 720 may receive encrypted data 770 in the rounded range from encrypted data retriever component 710, and may receive master key 650. Decryption component 720 may derive an encryption key for each data chunk of encrypted data 770 using master key 650, the chunk number, and the optional salt.

As further shown in FIG. 9, process 900 may include decrypting each data chunk in the portion with a corresponding encryption key (block 970), aggregating the decrypted data chunks to create a decrypted information portion (block 980), and providing the decryption information portion to the virtual machine (block 990). For example, in an implementation described above in connection with FIG. 7, using a corresponding derived encryption key, decryption component 720 may decrypt each data chunk of encrypted data 770 to generate decrypted data chunks 780. Chunk aggregator/discarder component 730 may receive decrypted data chunks 780 from decryption component 720, and may aggregate or reassemble decrypted data chunks 780 to generate requested portion 570 of ISO image 530. Chunk aggregator/discarder component 730 may provide requested portion 570 to virtual machine 410.

Systems and/or methods described herein may enable booting from local or a remote encrypted information (e.g., an encrypted ISO image), and may enable random blocks of data (i.e., data chunks) of the encrypted information to be decrypted without reading the entire information. The systems and/or methods may utilize any symmetric-key method to encrypt the information, such as an AES with a key size of two-hundred and fifty-six (256) bits and a pseudo randomly generated master key. The systems and/or methods may make the encrypted information available in a public domain, and may provide the master key and a location of the encrypted information to a decryption process. The decryption process may decrypt a portion of the encrypted information using the master key, and may make the decrypted information portion available to, for example, a virtual machine provided in a cloud computing environment.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 8 and 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method, comprising:
receiving an unencrypted International Organization for Standards (ISO) image, associated with booting one or more client devices, by a device provided in a data center connected to a cloud computing environment;

dividing, by the device, the unencrypted ISO image into multiple data chunks of a set data size, wherein a last data chunk is smaller than the set data size;

deriving, by the device, an encryption key for each data chunk based on a master key and a chunk number associated with each data chunk;

padding the last data chunk to correspond to the set data size;

encrypting, by the device, each data chunk with a corresponding derived encryption key;

aggregating, by the device, the encrypted data chunks to create an encrypted ISO image; and providing, by the device, the encrypted ISO image to one or more devices of the cloud computing environment, wherein the one or more devices of the cloud computing environment are to decrypt a portion of the encrypted ISO image for provision to the one or more client devices.

2. The method of claim 1, where deriving an encryption key for each data chunk further comprises:

deriving the encryption key for each data chunk using a secure cryptographic hash function, where the secure cryptographic hash function derives the encryption key for each data chunk based on the master key, the chunk number, and a randomly generated fixed length salt value.

3. The method of claim 2, where the secure cryptographic hash function comprises a SHA-256 hash algorithm.

4. A device provided in a data center connected to a cloud computing environment, the device comprising:

a memory; and a processor configured to:

receive an unencrypted International Organization for Standards (ISO) image associated with booting one or more client devices, divide the unencrypted ISO image into multiple data chunks of a set data size, padding the last data chunk to correspond to the set data size, derive an encryption key for each data chunk, of the multiple data chunks, based on a master key, a chunk number associated with each data chunk, and a salt value, pad the last data chunk to correspond to the set data size;

encrypt each data chunk with a corresponding derived encryption key, combine the encrypted data chunks to create an encrypted ISO image, and provide the encrypted ISO image to one or more devices of the cloud computing environment, where the one or more devices of the cloud computing environment are to decrypt a portion of the encrypted ISO image for provision to the one or more client devices.

5. The device of claim 4, wherein, when deriving an encryption key for each data chunk, the processor is further configured to:

derive the encryption key for each data chunk using a secure cryptographic hash function, wherein the secure cryptographic hash function derives the encryption key for each data chunk based on the master key, the chunk number, and the salt value.

6. The device of claim 5, where the secure cryptographic hash function comprises a SHA-256 hash algorithm.

7. A method, comprising:

receiving, by a device and from a virtual machine of the device, a request for a range of encrypted information that corresponds to less than an entirety of a stored International Organization for Standards (ISO) image associated with performing booting via the virtual machine;

rounding, by the device, a starting byte offset of the range down to a next lower chunk size, wherein the chunk size is a predetermined value, and a beginning value of the next lower chunk size is determined based on the starting byte offset;

rounding, by the device, an ending byte offset of the range up to a next upper chunk size, wherein a beginning value of the next upper chunk size is determined based on the ending byte offset;

retrieving, by the device, an encrypted information portion provided between the rounded starting byte offset and the rounded ending byte offset;

deriving, by the device, an encryption key for each data chunk, in the encrypted information portion, based on a master key, a chunk number associated with each data chunk, and a salt value;

decrypting, by the device, each data chunk with a corresponding derived encryption key;

aggregating, by the device, the decrypted data chunks to create a decrypted information portion; and providing, by the device, the decrypted information portion to the virtual machine.

8. The method of claim 7, further comprising:

receiving the encrypted information; and storing the encrypted information.

9. The method of claim 7, where the salt value comprises a randomly generated fixed length salt value.

10. A device, comprising:

a memory; and a processor configured to:

receive, from a virtual machine of the device, a request for a range of encrypted information that corresponds to less than an entirety of a stored International Organization for Standards (ISO) image associated with performing booting via the virtual machine, round a starting byte offset of the requested range down to a next lower chunk size to create first excess data with respect to the requested range, round an ending byte offset of the range up to a next upper chunk size to create second excess data with respect to the requested range, retrieve an encrypted information portion provided between the rounded starting byte offset and the rounded ending byte offset, determine an encryption key for each data chunk, in the encrypted information portion, based on a master key, a chunk number associated with each data chunk, and a salt value, decrypt each data chunk with a corresponding determined encryption key, aggregate the decrypted data chunks to create a decrypted information portion, determine that the decrypted information portion is larger than the requested range by at least a first amount corresponding to the first excess data and the second excess data, discard, from the decrypted information portion, an amount of data corresponding to the first amount to modify the decrypted information portion relative to the requested range, and provide the modified decrypted information portion to the virtual machine.

11. The device of claim 10, where the device is provided in a cloud computing environment.

12. The device of claim 10, where the processor is further to:
   receive the encrypted information, and
   store the encrypted information.

13. The device of claim 10, where each data chunk has a particular chunk size.

14. The device of claim 10, where the salt value comprises a randomly generated fixed length salt value.

15. The device of claim 10, wherein the virtual machine provides the modified decrypted information portion to a client device.

\* \* \* \* \*